United States Patent
Wells et al.

(10) Patent No.: US 10,597,007 B2
(45) Date of Patent: Mar. 24, 2020

(54) TURNTABLE

(71) Applicant: Toyota Motor Engineering & Manufacturing North America, Inc., Erlanger, KY (US)

(72) Inventors: Keith J. Wells, Evansville, IN (US); Robert D. McClain, Haubstadt, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 295 days.

(21) Appl. No.: 15/409,069

(22) Filed: Jan. 18, 2017

(65) Prior Publication Data

US 2018/0201237 A1   Jul. 19, 2018

(51) Int. Cl.
*B60S 13/02*   (2006.01)

(52) U.S. Cl.
CPC ....................... *B60S 13/02* (2013.01)

(58) Field of Classification Search
CPC ........................................... B60S 13/02
USPC .............................................. 104/43
See application file for complete search history.

(56) References Cited

U.S. PATENT DOCUMENTS

| | | | | |
|---|---|---|---|---|
| 2,395,528 A | * | 2/1946 | Andersen | B64F 1/24 104/44 |
| 2,566,634 A | * | 9/1951 | Ready | B60K 25/08 104/41 |
| 4,498,398 A | * | 2/1985 | Vallee | A47F 5/025 104/44 |
| 6,672,221 B2 | * | 1/2004 | Hadley | B64F 1/24 104/35 |
| 7,631,602 B2 | * | 12/2009 | Schwenker | B60S 13/02 104/35 |
| 2003/0101894 A1 | * | 6/2003 | Schwenker | B60S 13/02 104/35 |
| 2004/0035314 A1 | * | 2/2004 | Muchalov | B60S 13/02 104/44 |
| 2006/0230973 A1 | * | 10/2006 | Nebeker | B60S 13/02 104/35 |
| 2011/0215219 A1 | * | 9/2011 | Holt | B60S 13/02 248/652 |
| 2014/0261050 A1 | * | 9/2014 | Knapp | B61J 1/04 104/47 |
| 2018/0201237 A1 | * | 7/2018 | Wells | B60S 13/02 |

FOREIGN PATENT DOCUMENTS

EP            0162709 A2    11/1985

* cited by examiner

*Primary Examiner* — Jason C Smith
(74) *Attorney, Agent, or Firm* — Christopher G. Darrow; Darrow Mustafa PC (57) ABSTRACT

A turntable includes a floor-level deck and a central support system configured to support the deck for rotation by a central area of the deck. The deck has an underside, a topside and, at its central area, a central relief opening from its underside to its topside. The central support system includes an above-floor stanchion that extends through the deck's central relief, and a topside rotary bearing mounted between the stanchion and the deck to carry the deck for rotation.

20 Claims, 7 Drawing Sheets

TURNTABLE

TECHNICAL FIELD

The embodiments disclosed herein generally relate to turntables and, more specifically, to turntables used in industrial environments, such as assembly plants.

BACKGROUND

Turntables are sometimes used in industrial environments, such as assembly plants, that include tight spaces in which items, such as automated tow vehicles, have to be turned around or otherwise rotated. In some assembly plants that include a loading area and an assembly area, after part carriers are loaded with parts at loading areas, automated tow vehicles are used to move the part carriers to assembly areas, where the part carriers are unloaded of their parts. Conversely, after the part carriers are unloaded of their parts at the assembly areas, automated tow vehicles are used to move the part carriers back to the loading areas, where the part carriers are re-loaded with parts. In these assembly plants, turntables are sometimes used to rotate the automated tow vehicles in tight spaces to support their movement between the loading areas and the assembly areas.

SUMMARY

Disclosed herein are embodiments of a turntable with a floor-level deck and above-floor componentry that does not need to be accommodated in a pit.

In one aspect, a turntable includes a floor-level deck and a central support system configured to support the deck for rotation by a central area of the deck. The deck has an underside, a topside and, at its central area, a central relief opening from its underside to its topside. The central support system includes an above-floor stanchion that extends through the deck's central relief, and a topside rotary bearing mounted between the stanchion and the deck to carry the deck for rotation.

In another aspect, a turntable includes a floor-level deck and an above-floor undercarriage configured to support the deck for rotation. The deck has an underside and a topside, and a main body formed at least in part from one or more decking elements. The deck includes a topside reinforcement member having a box frame construction connected along a diameter of the deck to the one or more decking elements.

In yet another aspect, a turntable includes a floor-level deck, a central support system configured to support the deck for rotation by a central area of the deck, and a peripheral support system configured to support the deck for rotation by a peripheral area of the deck. The deck has a main body formed at least in part from a centrally located hub and one or more decking elements connected to the hub, and an underside, a topside and, at the hub, a central relief opening from its underside to its topside. The deck includes a topside reinforcement member having a box frame construction connected along a diameter of the deck to the one or more decking elements. The central support system includes an above-floor stanchion that extends through the deck's central relief, and a topside slewing bearing that has a stationary inner ring connected to the stanchion, and a rotating outer ring connected to the hub to carry the deck for rotation by the hub. The peripheral support system includes an underside peripheral guide rail connected to the deck, and one or more above-floor trolleys each including one or more rollers on which the underside peripheral guide rail rides.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a turntable whose deck has a low profile arrangement. The low profile arrangement of the deck is achieved without accommodating reinforcement, undercarriage, drive and other componentry in a pit.

Figure 1:
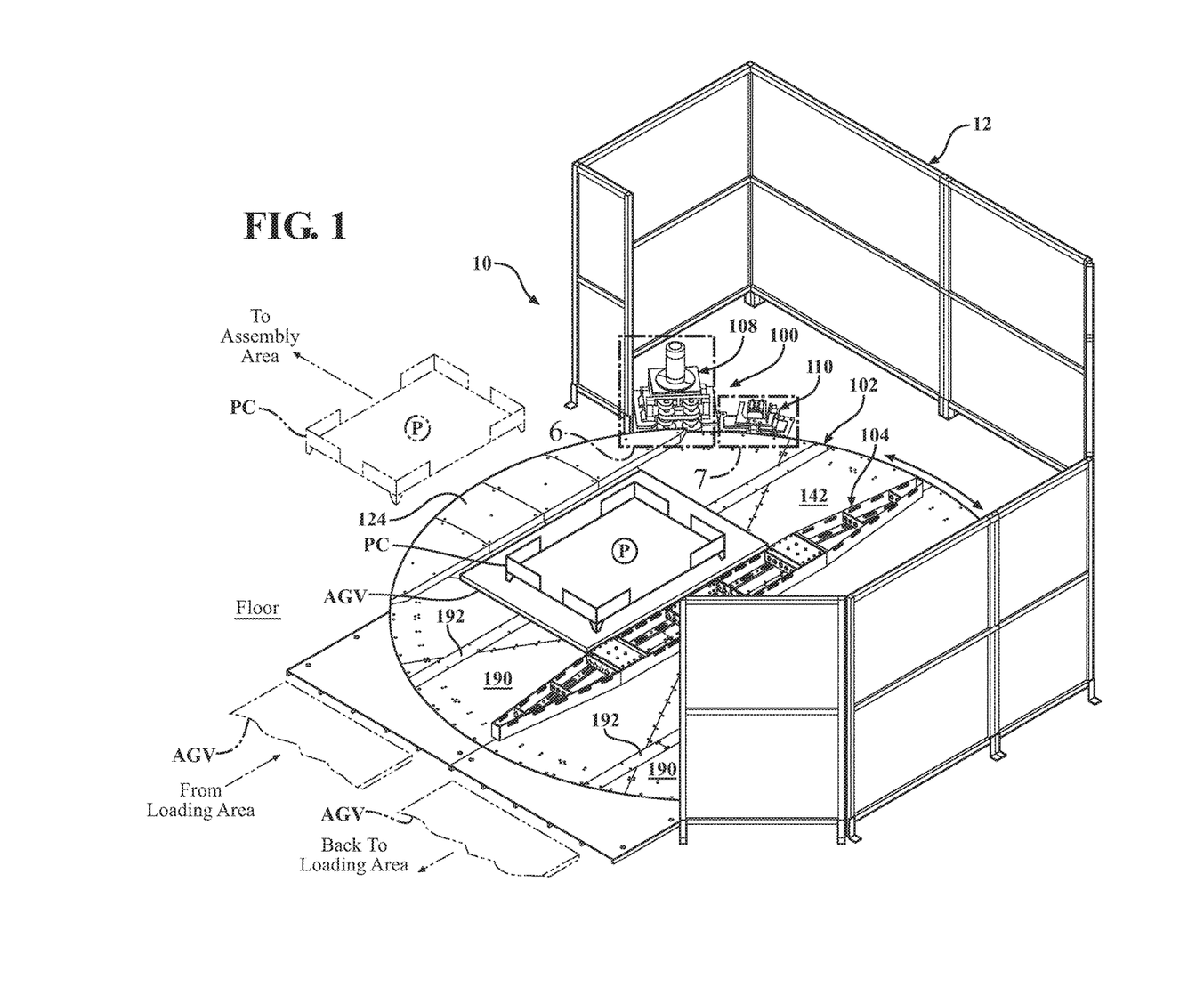
FIG. 1 is a partial perspective view of an assembly plant with a loading area and an assembly area, as well a turntable with a rotatable deck configured for turning onboard AGVs around in a tight space to support their movement from the assembly area to the loading area.

FIG. 1 shows an example of an assembly plant 10. As shown, the assembly plant 10 includes a loading area and an assembly area. The assembly area can be adapted for supporting the assembly of products, such as vehicles, on an assembly line, and the loading area can include parts P configured for assembly into the products on the assembly line. The parts P are illustrated schematically. The parts P can be individual components, collections of similar or different components, sub-assemblies or any other constituent portions of the products. The assembly area may individually support the complete assembly of the products on the assembly line, for example, or be one of multiple assembly areas collectively adapted to support the progressive assembly of the products on the assembly line.

Moveable part carriers PC are used in the assembly plant 10 to carry the parts P and deliver the parts P from the loading area to the assembly area. In general, the part carriers PC are adapted to carry one or more of the parts P, and are subject to being either loaded with one or more parts P or unloaded of one or more of their parts P. A given part carrier PC can be generically shaped and sized to carry a variety of different parts P, for example, or specially shaped and sized to carry an individual specific part P or multiple specific parts P. In the assembly plant 10, the part carriers PC are moved by automated tow vehicles, such as automated guide vehicles (AGVs).

In the assembly plant 10, the part carriers PC are used to deliver the parts P from the loading area to the assembly area in a repeating process. Initially, one part carrier PC, previously loaded with parts P and left at the assembly area, is unloaded of its parts P, which are assembled into products on the assembly line. Preferably before this part carrier PC is completely unloaded of its parts P, another part carrier PC is loaded with parts P at the loading area. The loaded part carrier PC is then moved from the loading area to the assembly area by an AGV, and left at the assembly area, where it is unloaded of its parts P. Meanwhile, the unloaded part carrier PC is moved from the assembly area back to the loading area by an AGV, and left at the loading area, where it is loaded with parts P. The loading area, the assembly area or both may be occupied by one or more operators tasked with loading unloaded part carriers PC with parts P, in the case of the loading area, and unloading loaded part carriers PC of their parts P, in the case of the assembly area.

After moving a loaded part carrier PC from the loading area to the assembly area, the AGVs have to be turned around to move an unloaded part carrier PC from the assembly area back to the loading area. As shown in FIG. 1, with a tight space in which the AGVs have to be turned around, the assembly plant 10 includes a guard 12 to shield the tight space, and a turntable 100 by which onboard AGVs can be turned around in the tight space to support their movement from the assembly area to the loading area.

The assembly plant 10 is presented as a non-limiting example of an industrial environment in which the turntable 100 may be implemented Likewise, the AGVs used to move the part carriers PC between the loading area and the assembly area are presented as non-limiting examples of items that the turntable 100, in operation, can turn around or otherwise rotate. It will be understood that the turntable 100 could be implemented in any industrial or non-industrial environment to rotate any items.

Figure 2:
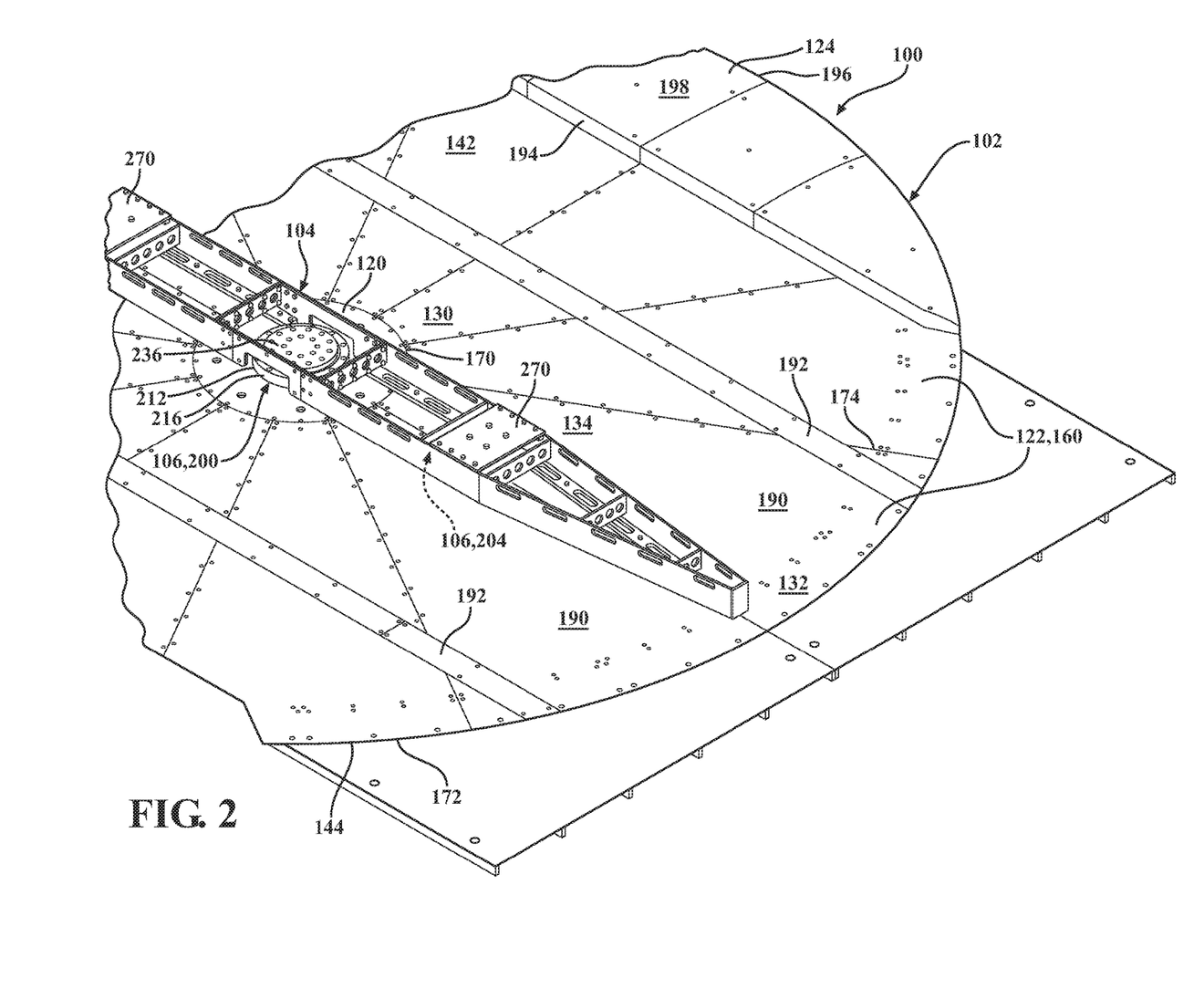
FIG. 2 is a partial perspective view of the turntable, showing the topside of its deck, as well as a topside reinforcement member of the deck, and topside components of an undercarriage that supports the deck for rotation.
Figure 3:
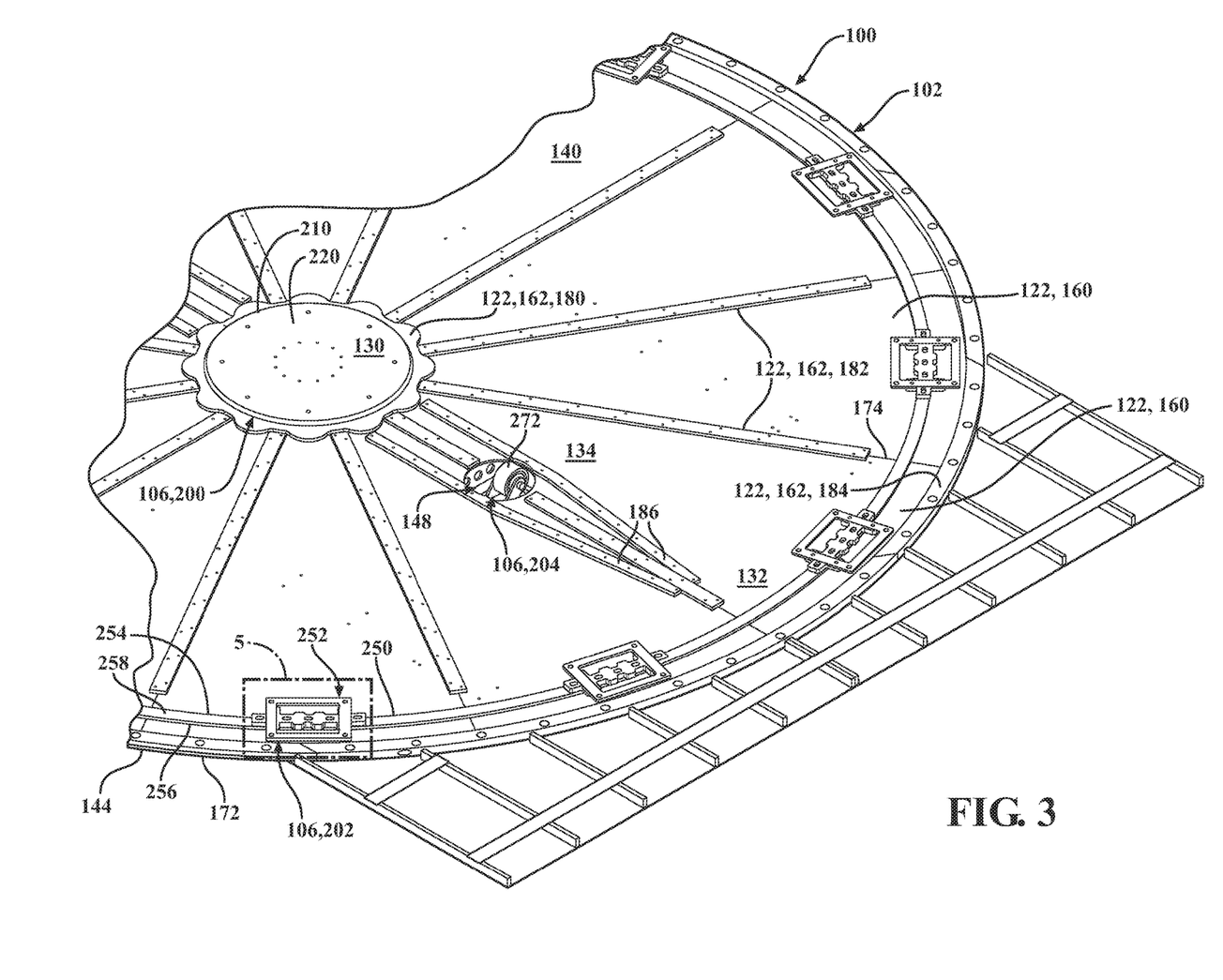
FIG. 3 is a partial perspective view of the turntable, showing the underside of its deck, as well as underside components of the undercarriage.
Figure 4:
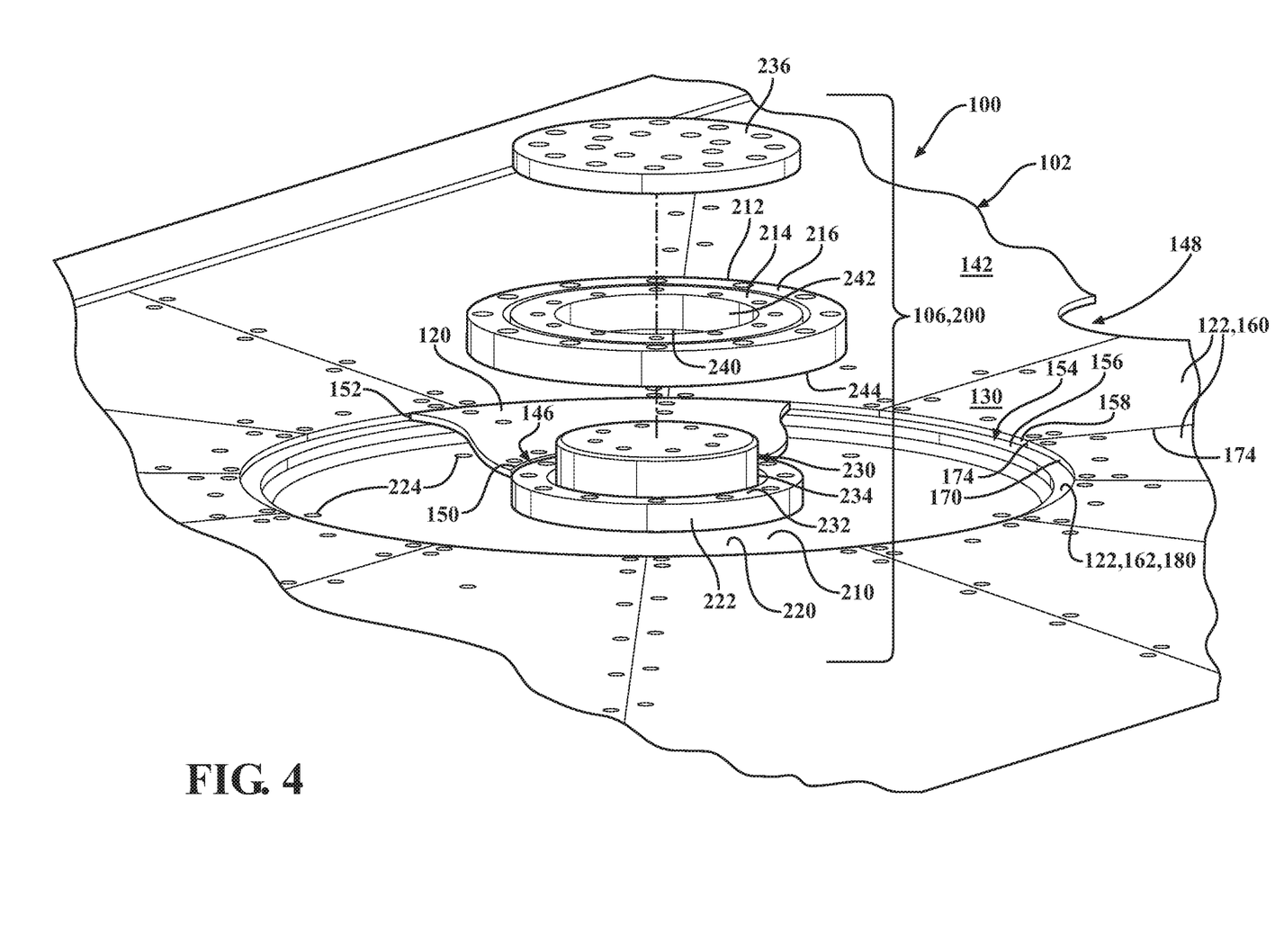
FIG. 4 is a partial perspective exploded view of the turntable, showing the topside of its deck, as well as, as part of the undercarriage, components of a central support system that supports the deck for rotation by its central area.

As shown with additional reference to FIGS. 2-4, the turntable 100 has a rigid, integral disk-shaped deck 102 oriented commonly with the floor. The deck 102 has a topside reinforcement member 104 that reinforces the deck 102 without requiring space below it to accommodate the topside reinforcement member 104. The turntable 100 also has a multisystem undercarriage 106 mounted between the floor and the deck 102 that supports the deck 102 for rotation. The undercarriage 106 is not accommodated in a pit but, nonetheless, allows a low profile arrangement for the deck 102. To selectively drive the rotation of the deck 102, the turntable 100 has a drive system 108. The turntable 100 also has a lock system 110 by which the deck 102 is selectively locked from rotating.

The deck 102 includes a hub 120, one or more decking elements 122, the topside reinforcement member 104 and pair of topside ramps 124. Although, in its illustrated configuration, these components of the deck 102 are made separately, it will be understood that some or all of these and other components of the deck 102, if any, could be made as a unitary whole. The separately made components of the deck 102 may be interconnected with fasteners, weldments, adhesives or any combination of these. The components of the deck 102 may be made from metal or any other suitable material or combination of materials.

The deck 102, with its disk-shaped configuration, has a central area 130 including its center, as well as a peripheral area 132 including its periphery and an intermediate area 134 between the central area 130 and the peripheral area 132. The deck 102 has a generally horizontal underside 140, an opposing generally horizontal topside 142 and, at its periphery, a circular upright outside edge 144 between its underside 140 and its topside 142. The underside 140 faces the floor, while the topside 142 is open to the assembly plant 10. At its central area 130, the deck 102 has a circular, centrally located central relief 146, as best shown in FIG. 4, opening from its underside 140 to its topside 142. As best shown in FIG. 3, the deck 102 has two additional circular intermediate reliefs 148 opening from its underside 140 to its topside 142 (one shown, with the other being a mirror image). The intermediate reliefs 148 are located along a diameter of the deck 102.

The hub 120 is centrally located at the central area 130 of the deck 102. The hub 120 forms a main body of the deck 102, at its central area 130, as a separate component to which the remainder of the deck 102 is connected. The hub 120 has an annular shape, with an inside circumference and an outside circumference, as well as opposing generally horizontal surfaces respectfully defining, at the central area 130 of the deck 102, its underside 140 and its topside 142. The central relief 146 of the deck 102 is formed at the inside circumference, at which a circular upright inside shoulder 150 is formed, while, at the outside circumference, a circular upright outside shoulder 152 is formed.

The remainder of the deck 102 includes the decking elements 122. The decking elements 122 form the main body of the deck 102, outside of its central area 130, as separate components connected to the hub 120. The decking elements 122, collectively, have an annular shape, with an inside circumference and an outside circumference, as well as opposing generally horizontal surfaces respectfully defining, outside of the central area 130 of the deck 102, its underside 140 and its topside 142. As best shown in FIG. 4, a circular inside step 154, with an inside lip 156 and an upright inside shoulder 158 bordering the inside lip 156, is formed at the inside circumference. In this configuration, the inside step 154 of the collective decking elements 122 accommodates the hub 120, with the inside lip 156 abutting outside portions of the hub 120 bordering its upright outside shoulder 152, and with the upright inside shoulder 158 abutting the upright outside shoulder 152 of the hub 120. The upright outside edge 144 of the deck 102 is formed at the outside circumference.

The decking elements 122 may, as generally shown, include one or more primary decking elements 160 and one or more auxiliary decking elements 162. Collectively, the primary decking elements 160 largely form the main body of the deck 102 outside of its central area 130, and substantially define, among other things, the underside 140 and the topside 142 of the deck 102 outside of its central area 130. The auxiliary decking elements 162, on the other hand, perform other structural functions, including without limitation making or otherwise supporting connections between the remainder of the collective decking elements 122 and the hub 120, as well as between the primary decking elements 160.

The primary decking elements 160 each form an equal part of the main body of the deck 102. With the decking elements 122 collectively having an annular shape, each of the primary decking elements 160 is generally pie shaped. Somewhat more specifically, each of the primary decking elements 160 is annular sector shaped, with an inside arc, an outside arc and two radial sides. Each of the primary decking elements 160 radiates outward from the hub 120, and is adjacent to its two neighboring primary decking elements 160.

At their inside arcs, each of the primary decking elements 160 forms its own upright inside shoulder 170 as part of the larger upright inside shoulder 158 of the inside step 154 of the collective decking elements 122. Each of the upright inside shoulders 170 of the primary decking elements 160, similarly to the upright inside shoulder 158 of the inside step 154 of the collective decking elements 122, abuts the upright outside shoulder 152 of the hub 120. The outside circumference of the collective decking elements 122 is formed across the outside arcs of the primary decking elements 160. At their outside arcs, each of the primary decking elements 160 forms its own upright outside edge 172 as part of the larger upright outside edge 144 of the deck 102.

The radial sides of the primary decking elements 160 collectively radiate outward from the hub 120. An upright radial shoulder 174 is formed at each of the radial sides of the primary decking elements 160. Each radial side of any given primary decking element 160 is oriented in common with a radial side of an adjacent neighboring primary decking element 160. Accordingly, pairs of commonly oriented upright radial shoulders 174 of respective adjacent neighboring primary decking elements 160 abut one another and radiate, together, outward from the hub 120.

As part of the integral formation of the deck 102, the auxiliary decking elements 162 connect the remainder of the collective decking elements 122 to the hub 120. For this purpose, the auxiliary decking elements 162 include a central annular plate 180. The central annular plate 180 is located at the underside 140 of the deck 102, at its central area 130, concentrically with the hub 120. The central annular plate 180 is sized to connect across the inside arcs of the primary decking elements 160 and the outside circumference of the hub 120. In this configuration, with each of the upright inside shoulders 170 of the primary decking elements 160 abutting the upright outside shoulder 152 of the hub 120, the central annular plate 180 is connected to the inside portions of each of the primary decking elements 160 bordering their upright inside shoulders 170, and forms the inside lip 156 of the inside step 154 of the collective decking elements 122, which is connected to the outside portions of the hub 120 bordering its upright outside shoulder 152. A single strap joint is thereby formed between the primary decking elements 160, at their inside arcs, and the hub 120, at its outside circumference.

As a further part of the integral formation of the deck 102, the auxiliary decking elements 162 connect the primary decking elements 160 to one another at, and along, their radial sides. For this purpose, the auxiliary decking elements 162 include radial elongate plates 182. The radial elongate plates 182 are located at the underside 140 of the deck 102, and radiate outward from its central area 130. The radial elongate plates 182 are each sized to connect across, and along, a pair of commonly oriented radial sides of respective adjacent neighboring primary decking elements 160. In this configuration, with pairs of commonly oriented upright radial shoulders 174 of respective adjacent neighboring primary decking elements 160 abutting one another, each of the radial elongate plates 182 is connected across, and along, radial portions of the respective adjacent neighboring primary decking elements 160 bordering their pair of commonly oriented upright radial shoulders 174. A single strap joint is thereby formed between the adjacent neighboring primary decking elements 160 along their respective radial sides.

To further connect the primary decking elements 160 to one another at their radial sides, but along their outside arcs, the auxiliary decking elements 162 include a peripheral annular plate 184. The peripheral annular plate 184 is located at the underside 140 of the deck 102, at its periphery, concentrically with the hub 120. The peripheral annular plate 184 is sized to connect across each pair of commonly oriented radial sides of respective adjacent neighboring primary decking elements 160, at their outside arcs. In this configuration, with pairs of commonly oriented upright radial shoulders 174 of respective adjacent neighboring primary decking elements 160 abutting one another, the peripheral annular plate 184 is connected across radial portions of the respective adjacent neighboring primary decking elements 160 bordering their pair of commonly oriented upright radial shoulders 174, along their outside arcs. Moreover, with each of the primary decking elements 160 forming its own upright outside edge 172 as part of the larger upright outside edge 144 of the deck 102, the peripheral annular plate 184 itself forms part of the upright outside edge 144 of the deck 102. A single strap joint is thereby formed between the primary decking elements 160 along their outside arcs. With the peripheral annular plate 184, as shown, made from separate components, the junctions of its components are staggered from the pairs of commonly oriented radial sides of respective adjacent neighboring primary decking elements 160.

As best shown in FIG. 2, the topside reinforcement member 104 is located at the topside 142 of the deck 102. The topside reinforcement member 104 has a box frame construction, and is sized to span the same diameter of the deck 102 along which the intermediate reliefs 148 are located. In this configuration, the topside reinforcement member 104 is connected along the diameter of the deck 102 to the decking elements 122 forming its main body. This connection is supported by opposing elongate plates 186 located at the underside 140 of the deck 102. The connection of the topside reinforcement member 104 to the main body of the deck 102 along its diameter increases the rigidity of the main body of the deck 102 across its diameter. This increases the resistance to bending of the deck 102 across its diameter, and reinforces the deck 102 against the loading resulting from the transfer of the AGVs from the floor to the deck 102. With the topside reinforcement member 104 located at the topside 142 of the deck 102, this reinforcement is achieved without requiring space below the deck 102 to accommodate the topside reinforcement member 104.

The topside reinforcement member 104, with its box frame construction, projects from the remainder of the deck 102. The topside reinforcement member 104 accordingly separates the deck 102 into two section shaped sections on either side of the topside reinforcement member 104. At its topside 142, the deck 102 has two parallel lanes 190, one across each of its sections, whose positions are transposed with 180 degree rotations of the deck 102. Each of the lanes 190 is sized to support the movement of the AGVs therein across the topside 142 of the deck 102, and has an outside, an opposing inside and, to facilitate the transfer of the AGVs between the deck 102 and the floor, opposing ends open to the periphery of the deck 102. The deck 102 includes a guide strip 192 along each of its lanes 190 that the AGVs are configured to follow to transfer between the deck 102 and the floor.

With the topside reinforcement member 104 located to the inside of each of the lanes 190, each of the topside ramps 124 is located at the topside 142 of the deck 102, spaced apart from the topside reinforcement member 104, to the outside of a respective lane 190. With an AGV onboard the deck 102 in a respective lane 190, each of the topside ramps 124 facilitates the transfer of the parts carriers PC between the AGV and the floor. Each of the topside ramps 124 is sized to have a footprint matching the remainder of the deck 102 to the outside of a respective lane 190. Accordingly, each of the topside ramps 124 is segment shaped. Each of the topside ramps 124 is connected to the decking elements 122 forming the main body of the deck 102, and has a high side 194 along the outside of a respective lane 190, a low side 196 along the periphery of the deck 102 and a ramped surface 198 sloping downward from the high side 194 to the low side 196. The low side 196 of each of the topside ramps 124 merges into the circular upright outside edge 144 of the deck 102.

Beyond the deck 102, the turntable 100 includes the undercarriage 106 that supports the deck 102 for rotation about its central axis. The undercarriage 106 is mounted between the floor and the deck 102. With this floor-mounted configuration, the undercarriage 106 does not need to be accommodated in a pit, which would be both expensive to install and unconducive to the overall flexibility of the assembly plant 10. Notwithstanding its floor-mounted configuration, the space required below the deck 102 to accommodate the undercarriage 106 is minimal. The deck 102, as a result, is floor-level or, in other words, substantially not elevated from the floor. Accordingly, in the turntable 100, the undercarriage 106 allows a low profile arrangement for the deck 102 where, at the periphery of the deck 102, its topside 142 is generally contiguous with the floor to facilitate the transfer of the AGVs between the deck 102 and the floor.

The undercarriage 106 includes different support systems that support the deck 102 for rotation by different areas of the deck 102. More specifically, the undercarriage 106 includes a central support system 200 that supports the deck 102 for rotation by its central area 130, a peripheral support system 202 that supports the deck 102 for rotation by its peripheral area 132 and an intermediate support system 204 that supports the deck 102 for rotation by its intermediate area 134.

The central support system 200 is centrally located at the central area 130 of the deck 102. The central support system 200 includes an above-floor rigid stanchion 210 that extends through the central relief 146 of the deck 102, and a topside rotary bearing 212. The topside rotary bearing 212 has two rotation elements 214, 216 that rotate with respect to one another. One of the rotation elements 214 of the topside rotary bearing 212 is connected to the stanchion 210. This locates the topside rotary bearing 212 at the topside 142 of the deck 102, and immobilizes it as a stationary rotation element 214. The other of the rotation elements 216 of the topside rotary bearing 212 is, on the other hand, free to rotate as a rotating rotation element 216, and is connected to the main body of the deck 102, at its central area 130. In this arrangement of the central support system 200, the topside rotary bearing 212 is mounted between the stanchion 210 and the central area 130 of the deck 102 to carry the deck 102 for rotation. With the topside rotary bearing 212 located, via the stanchion 210, at the topside 142 of the deck 102, the arrangement of the central support system 200 is achieved without requiring space below the deck 102 to accommodate the topside rotary bearing 212.

The stanchion 210 includes a disk-shaped base 220 and a cylindrical upright portion 222 extending from the base 220. The base 220 is located at the underside 140 of the deck 102, and rests on the floor. The base 220 underlies the hub 120 and, by extension, the main body of the deck 102 at its central area 130. The base 220 may have any number of bolt receiving holes 224 by which the stanchion 210 as a whole is mountable to the floor. In the illustrated mounting configuration, the base 220 has a number of bolt receiving holes 224 sized to receive bolts, and the floor is configured to retentively receive bolts extending through the bolt receiving holes 224. With the base 220 underlying the hub 120, the upright portion 222 extends, concentrically with the hub 120, from the base 220 through the central relief 146 of the deck 102 formed at the inside circumference of the hub 120. At the topside 142 of the deck 102, the upright portion 222 forms, at its top, an outside step 230, with an outside lip 232 and an upright outside shoulder 234 bordering the outside lip 232. The upright portion 222 includes a cap 236 at its top to cover the outside step 230.

The topside rotary bearing 212 is a slewing bearing located concentrically with the hub 120. The slewing bearing has, respectively, as its two rotation elements 214, 216 that rotate with respect to one another, an inner ring and an outer ring that house ball bearings between themselves.

The inner ring is sized to rest atop the stanchion 210, on the outside step 230 of its upright portion 222. In this configuration, the outside step 230 of the upright portion 222 of the stanchion 210 accommodates the inner ring, with the outside lip 232 abutting an underside face 240 of the inner ring, and with the upright outside shoulder 234 abutting an inside face 242 the inner ring. The cap 236 of the upright portion 222 of the stanchion 210 covers its outside step 230, and is connected to its outside step 230 through the inner ring. This locates the slewing bearing at the topside 142 of the deck 102, and connects the inner ring to the upright portion 222 of the stanchion 210 at its outside step 230. This, moreover, immobilizes the inner ring as the stationary rotation element 214, while leaving the outer ring free to rotate as the rotating rotation element 216.

The outer ring is sized larger than the central relief 146 of the deck 102 formed at the inside circumference of the hub 120. With the slewing bearing located at the topside 142 of the deck 102, at its central area 130, concentrically with the hub 120, the outer ring is sized to overlie, and connect to, the hub 120. In this configuration, inside portions of the hub 120 bordering its upright inside shoulder 150 formed at its inside circumference abut an underside face 244 of the outer ring, and the outer ring is connected to the inside portions of the hub 120. This connects the outer ring to the main body of the deck 102, at its central area 130, with the slewing bearing carrying the deck 102 for rotation via the outer ring.

Figure 5:
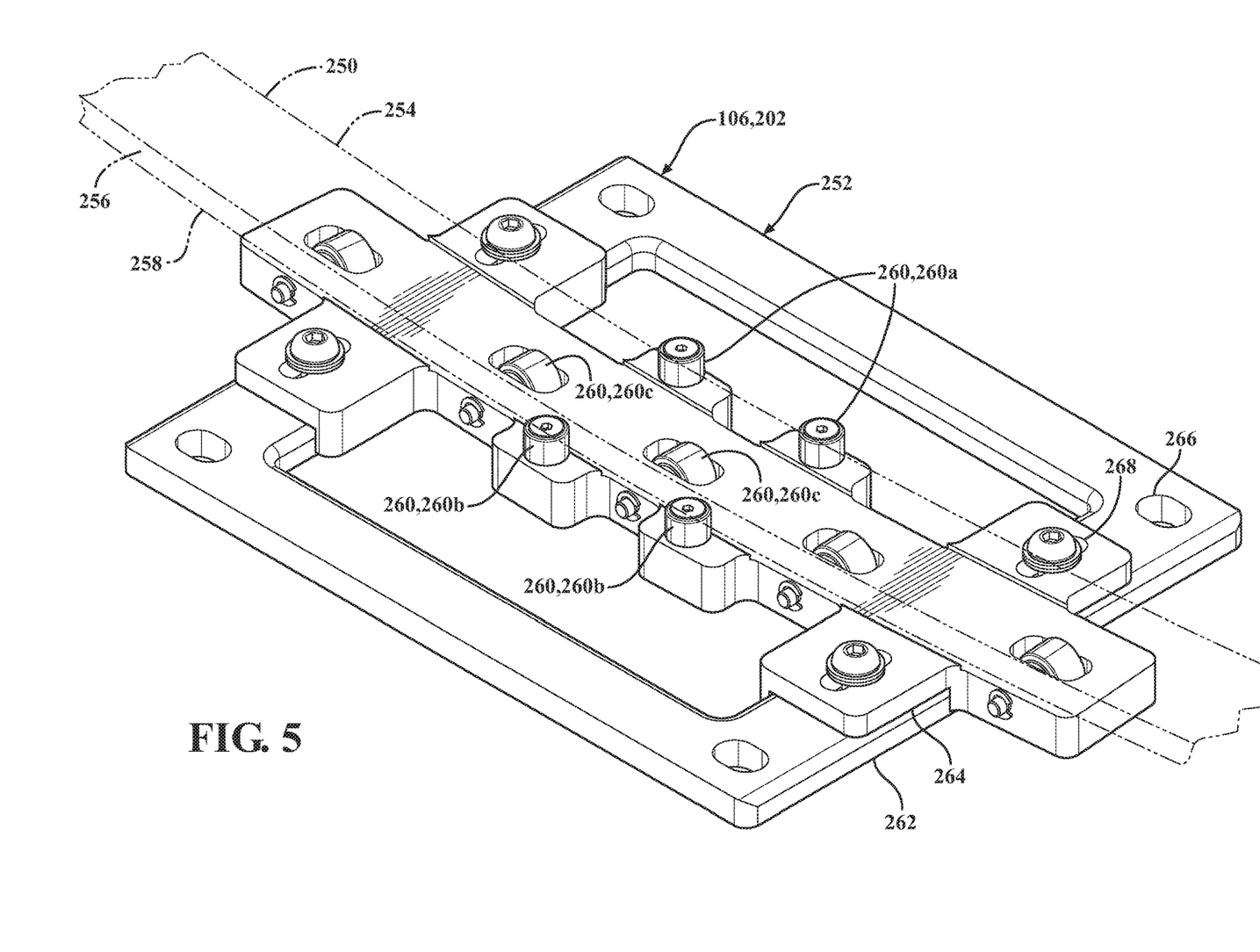
FIG. 5 is a detailed partial perspective view of the turntable, showing, as part of the undercarriage, components of a peripheral support system that supports the deck for rotation by its peripheral area.

The peripheral support system 202 is located at the peripheral area 132 of the deck 102. The peripheral support system 202 includes an underside peripheral guide rail 250 connected to the deck 102, and one or more complementary above-floor trolleys 252 on which the underside peripheral guide rail 250 rides to guide the rotation of the deck 102 while supporting it against the loading resulting from the transfer of the AGVs from the floor to the deck 102.

The underside peripheral guide rail 250 is located at the underside 140 of the deck 102, at its peripheral area 132, concentrically with the hub 120. The underside peripheral guide rail 250 projects from the remainder of the deck 102. It has an annular shape, with an inside circumference at which a circular upright inside bearing surface 254 is formed, an outside circumference at which a circular upright outside bearing surface 256 is formed, and a crown bearing surface 258. Similarly to the peripheral annular plate 184 of the auxiliary decking elements 162, the underside peripheral guide rail 250 is sized to connect across each pair of commonly oriented radial sides of respective adjacent neighboring primary decking elements 160. In this configuration, with pairs of commonly oriented upright radial shoulders 174 of respective adjacent neighboring primary decking elements 160 abutting one another, the underside peripheral guide rail 250 is connected across radial portions of the respective adjacent neighboring primary decking elements 160 bordering their pair of commonly oriented upright radial shoulders 174. This connects the underside peripheral guide rail 250 to the main body of the deck 102 at its peripheral area 132.

The trolleys 252 are located at the underside 140 of the deck 102, and underlie the main body of the deck 102 at its peripheral area 132. The trolleys 252 are arranged in the footprint of the underside peripheral guide rail 250. With peripheral support system 202, as shown, including more than one trolley 252, the trolleys 252 are circumferentially arranged concentrically with the hub 120 in the footprint of the underside peripheral guide rail 250.

As shown with additional reference to FIG. 5, each of the trolleys 252 includes a number of rollers 260. With the underside peripheral guide rail 250 projecting from the remainder of the deck 102, these rollers 260 are aligned with the underside peripheral guide rail 250, and are supported by the remainder of the trolleys 252 for engagement with one, some or all of the upright inside bearing surface 254, the upright outside bearing surface 256 and the crown bearing surface 258 of the underside peripheral guide rail 250. In this arrangement of the peripheral support system 202, the underside peripheral guide rail 250 rides on the rollers 260, and the rollers 260 individually, and collectively, guide the rotation of the deck 102 while supporting it against the loading resulting from the transfer of the AGVs from the floor to the deck 102.

The representative trolley 252 shown in FIG. 5 includes a set of circumferentially aligned and uprightly oriented inside rollers 260a supported by the remainder of the trolley 252 for engagement with the upright inside bearing surface 254 of the underside peripheral guide rail 250, and a set of circumferentially aligned and uprightly oriented outside rollers 260b supported by the remainder of the trolley 252 for engagement with the upright outside bearing surface 256 of the underside peripheral guide rail 250. The trolley 252 further includes a set of circumferentially aligned and generally horizontally oriented rollers 260c supported by the remainder of the trolley 252 for engagement with the crown bearing surface 258 of the underside peripheral guide rail 250.

The trolley 252 is subject to adjustable positioning on the floor to align its rollers 260 with the underside peripheral guide rail 250. The representative trolley 252 shown in FIG. 5 includes a base 262 and, as a separate component connected to the base 262, a roller body 264 supporting its rollers 260. The base 262 may have any number of bolt receiving holes 266 by which the trolley 252 as a whole is mountable to the floor, while the roller body 264 may have any number of bolt receiving holes 268 by which the roller body 264 is mountable to the base 262. In the illustrated mounting configuration, the base 262 has a number of elongated bolt receiving holes 266 sized to receive bolts at different locations in the direction of elongation, and the floor is configured to retentively receive bolts extending through the bolt receiving holes 266. Similarly, the roller body 264 has a number of elongated bolt receiving holes 268 sized to receive bolts at different locations in the direction of elongation, and the base 262 is configured to retentively receive bolts extending through the bolt receiving holes 268.

Where, as shown, the direction of elongation of the bolt receiving holes 266 of the base 262 is circumferential, and the direction of elongation of the bolt receiving holes 268 of the roller body 264 is radial, the trolley 252 is subject to adjustable positioning on the floor in the circumferential direction of elongation of the bolt receiving holes 266 of the base 262 or the radial direction of elongation of the bolt receiving holes 268 of the roller body 264, or both, to align its rollers 260 with the underside peripheral guide rail 250.

The intermediate support system 204 is located at the intermediate area 134 of the deck 102. The intermediate support system 204 includes one or more topside caster mounting brackets 270 connected to the deck 102, and respective casters 272 mounted to the topside caster mounting brackets 270. The casters 272 extend through the intermediate reliefs 148 of the deck 102, and ride on the floor to support the deck 102 against the loading resulting from the transfer of the AGVs from the floor to the deck 102. With the casters 272 located, via the topside caster mounting brackets 270, largely at the topside 142 of the deck 102, the arrangement of the intermediate support system 204 is achieved without requiring space below the deck 102 to accommodate the entire casters 272.

With intermediate support system 204, as shown, including more than one caster 272, the casters 272 and their topside caster mounting brackets 270 are arranged concentrically with the hub 120, in alignment with the intermediate reliefs 148, along the diameter of the deck 102 along which the intermediate reliefs 148 are located. Where the deck 102 has two intermediate reliefs 148, the peripheral support system 202 includes two topside caster mounting brackets 270 and two respective casters 272 mounted to the topside caster mounting brackets 270 and extending through the intermediate reliefs 148. With these intermediate reliefs 148 located along the same diameter of the deck 102 along which the topside reinforcement member 104 spans, the topside caster mounting brackets 270 are incorporated into the box frame construction of the topside reinforcement member 104. This connects the topside caster mounting brackets 270 to the main body of the deck 102 at its intermediate area 134.

With the deck 102 supported by the undercarriage 106 for rotation about its central axis, the drive system 108 is selectively operable to drive the rotation of the deck 102. This rotation includes 180 degree rotations of the deck 102 or, in other words, turning the deck 102 around, to transpose the positions of its lanes 190, as well as other rotations of the deck 102 to other rotational positions. Once the drive system 108 drives the rotation of the deck 102 to a particular rotational position, the lock system 110 is selectively operable to lock the deck 102 from rotating and, as a result, lock the deck 102 in that rotational position. With the deck 102 locked from rotating, the deck 102 is ready for the transfer of the AGVs between it and the floor. The drive system 108 and the lock system 110 are mounted between the floor and the deck 102. With their floor-mounted configurations, the drive system 108 and the lock system 110, like the undercarriage 106, do not need to be accommodated in a pit.

The drive system 108 is arranged to the side of the deck 102, at its periphery, and drives the rotation of the deck 102 by its peripheral area 132. As shown with additional reference to FIG. 6, the drive system 108 includes a number of uprightly oriented drive wheels 280. With the drive system 108 arranged to the side of the deck 102, the drive wheels 280 are supported by the remainder of the drive system 108 for engagement with the upright outside edge 144 of the deck 102. The drive system 108, in this arrangement, is implemented in a friction drive configuration where, with the selective operation of the drive system 108, its drive wheels 280 are rotated against the upright outside edge 144 of the deck 102 to drive the rotation of the deck 102 by its peripheral area 132.

Figure 6:
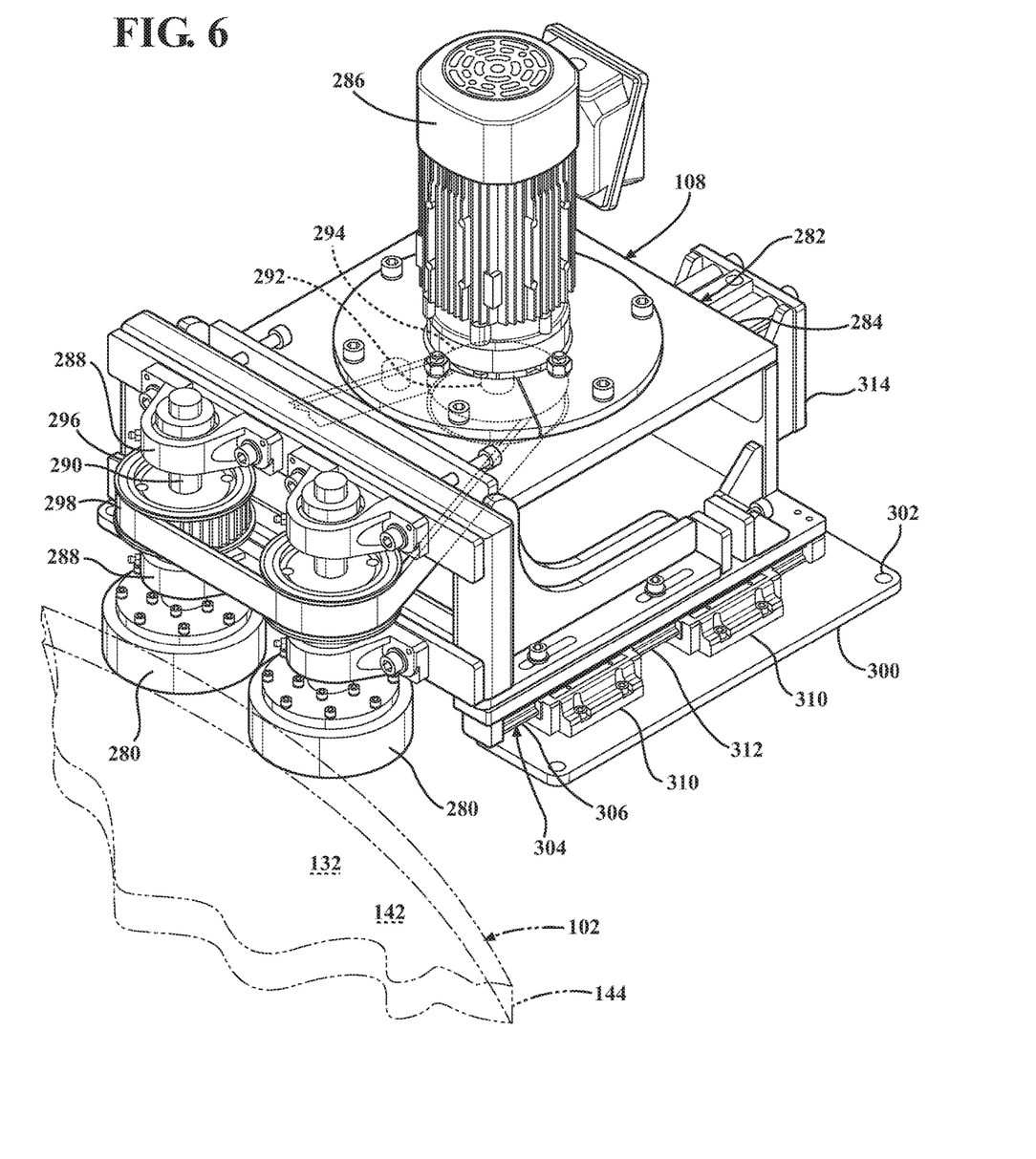
FIG. 6 is a detailed partial perspective view of the turntable, showing components of a drive system that is selectively operable to drive the rotation of the deck.

The drive wheels 280 are included in the drive system 108 as part of a drive unit 282 that powers the rotation of the drive wheels 280. The drive unit 282 has a frame 284, to which an electric motor 286 and, for each of the drive wheels 280, a set of pillow block bearings 288 are mounted. The sets of pillow block bearings 288 each support a drive shaft 290 in a parallel, spaced apart relationship with an output shaft 292 of the electric motor 286. A driven sheave 294 is fixed on the output shaft 292 of the electric motor 286 and, for each of the drive wheels 280, a driver sheave 296 is aligned with the driven sheave 294 and fixed on its drive shaft 290 together with the drive wheel 280. With a drive belt 298 connected between the driven sheave 294 and the driver sheave 296 for each of the drive wheels 280, the drive wheels 280 are rotated when the electric motor 286 is powered.

In the drive system 108, the drive unit 282 is subject to selective positioning to engage its drive wheels 280 with the upright outside edge 144 of the deck 102. The drive system 108 includes a base 300 as a separate component to which the drive unit 282 is connected. The base 300 may have any number of bolt receiving holes 302 by which the drive system 108 as a whole is mountable to the floor. In the illustrated mounting configuration, the base 300 has a number of bolt receiving holes 302 sized to receive bolts, and the floor is configured to retentively receive bolts extending through the bolt receiving holes 302. With the drive system 108 arranged to the side of the deck 102, the base 300 supports the drive unit 282 for radial movement towards and, by extension, away from the deck 102.

The base 300 includes, as part of its supporting structure for the drive unit 282, a linear slide assembly 304 that carries the drive unit 282 for radial movement. The linear slide assembly 304 includes one or more linear slides 306 mounted to the base 300 and oriented in the radial direction. Each of the linear slides 306 includes a set of carriages 310 mounted on the base 300, and a guide rail 312, on which the frame 284 of the drive unit 282 is mounted, riding on the carriages 310. Each carriage 310 may be or include a sleeve bearing carriage, a ball bearing carriage or a track roller carriage, for example, or any combination of these. The base 300 also includes, either as part of or separately from its supporting structure for the drive unit 282, an actuator 314 mounted to the remainder of the base 300 and coupled to the frame 284 of the drive unit 282. The actuator 314 is subject to selective operation to impart radial movement to the drive unit 282 via its frame 284. The base 300 as a whole is, in turn, selectively operable to position the drive unit 282 to engage its drive wheels 280 with the upright outside edge 144 of the deck 102. Where the actuator 314 is, as shown, a linear actuator oriented in the radial direction, the actuator 314 may be a pneumatic, hydraulic or motorized linear actuator, for example.

The lock system 110 is arranged to the side of the deck 102, at its periphery, and locks the deck 102 from rotating by its peripheral area 132. As shown with additional reference to FIG. 7, the lock system 110 includes a tongue 320 shaped for fitment into a complementary recess 322 opening from the upright outside edge 144 of the deck 102. In the lock system 110, the tongue 320 is supported by the remainder of the lock system 110, and subject to selective positioning for engagement within the recess 322. With the selective operation of the lock system 110, its tongue 320 is radially moved into engagement within the recess 322 to lock the deck 102 from rotating.

Figure 7:
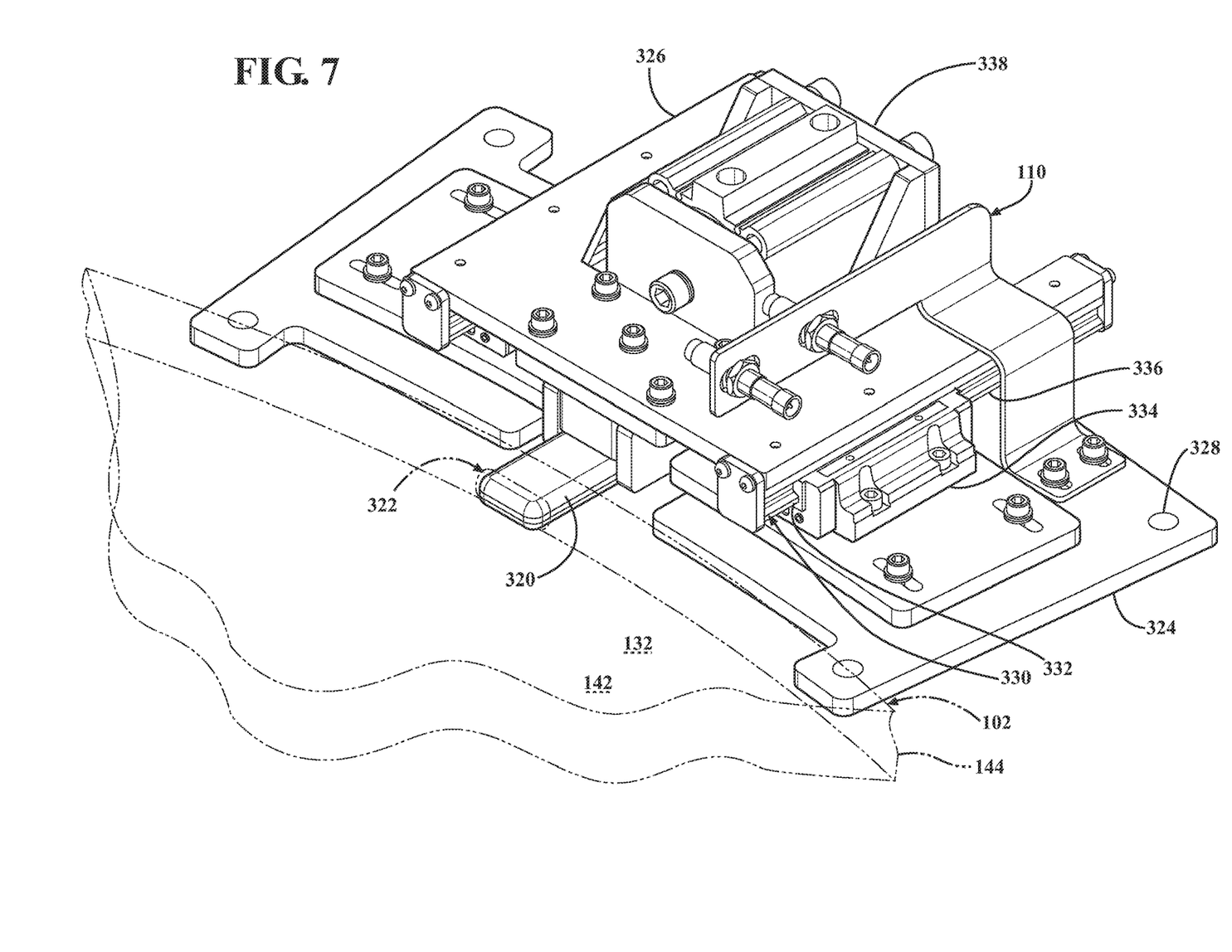
FIG. 7 is a detailed partial perspective view of the turntable, showing components of a lock system that is selectively operable to lock the deck from rotating.

The lock system 110 includes a base 324 as a separate component to which a frame 326 carrying the tongue 320 is connected. The base 324 may have any number of bolt receiving holes 328 by which the lock system 110 as a whole is mountable to the floor. In the illustrated mounting configuration, the base 324 has a number of bolt receiving holes 328 sized to receive bolts, and the floor is configured to retentively receive bolts extending through the bolt receiving holes 328. With the lock system 110 arranged to the side of the deck 102, the base 324 supports the tongue 320 for radial movement towards and, by extension, away from the deck 102.

The base 324 includes, as part of its supporting structure for the tongue 320, a linear slide assembly 330 that carries the tongue 320 for radial movement. The linear slide assembly 330 includes one or more linear slides 332 mounted to the base 324 and oriented in the radial direction. Each of the linear slides 332 includes a carriage 334 mounted on the base 324, and a guide rail 336, on which the frame 326 carrying the tongue 320 is mounted, riding on the carriage 334. The carriage 334 may be or include a sleeve bearing carriage, a ball bearing carriage or a track roller carriage, for example, or any combination of these. The base 324 also includes, either as part of or separately from its supporting structure for the tongue 320, an actuator 338 mounted to the remainder of the base 324 and coupled to the frame 326. The actuator 338 is subject to selective operation to impart radial movement to the tongue 320 via the frame 326. The base 324 as a whole is, in turn, selectively operable to position the tongue 320 for engagement within the recess 322. Where the actuator 338 is, as shown, a linear actuator oriented in the radial direction, the actuator 338 may be a pneumatic, hydraulic or motorized linear actuator, for example.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A turntable, comprising:
   a floor-level deck with an underside, a topside and, at a central area of the deck, a central relief opening from its underside to its topside; and
   a central support system configured to support the deck for rotation by its central area, the central support system including an above-floor stanchion that extends through the deck's central relief, and a topside rotary bearing mounted between the stanchion and the deck to carry the deck for rotation.

2. The turntable of claim 1, wherein the topside rotary bearing is a slewing bearing that has a stationary inner ring connected to the stanchion, and a rotating outer ring connected to a main body of the deck to carry the deck for rotation.

3. The turntable of claim 1, wherein the deck has a main body formed at least in part from a centrally located hub and one or more decking elements connected to the hub, and the topside rotary bearing is connected to the hub to carry the deck for rotation by the hub.

4. The turntable of claim 1, wherein the deck has a main body formed at least in part from one or more decking elements, and includes a topside reinforcement member connected to the one or more decking elements.

5. The turntable of claim 4, wherein the topside reinforcement member has a box frame construction, is connected along a diameter of the deck, and projects from the remainder of the deck to separate the deck into two sections on either side of the topside reinforcement member.

6. The turntable of claim 1, further comprising:
a peripheral support system configured to support the deck for rotation by a peripheral area of the deck, the peripheral support system including an underside peripheral guide rail connected to the deck, and one or more above-floor trolleys each including one or more rollers on which the underside peripheral guide rail rides.

7. The turntable of claim 1, wherein the deck has, at an intermediate area of the deck, one or more intermediate reliefs opening from its underside to its topside, further comprising:
an intermediate support system configured to support the deck for rotation by its intermediate area, the intermediate support system including, for each of the deck's one or more intermediate reliefs, a topside caster mounting bracket connected to the deck, and a caster mounted to the topside caster mounting bracket and extending through the deck's intermediate relief to ride on a floor.

8. The turntable of claim 1, further comprising:
an above-floor drive system arranged to a side of the deck, the drive system including one or more drive wheels supported for powered rotation against the deck, at a peripheral area thereof, to drive the rotation of the deck.

9. The turntable of claim 8, wherein the drive system includes a drive unit that powers the rotation of the one or more drive wheels, and a base that supports the drive unit for selective radial movement to position the drive unit to engage the drive unit's one or more drive wheels against the deck.

10. The turntable of claim 1, wherein the deck has, at a peripheral area of the deck, a recess, further comprising:
an above-floor lock system arranged to a side of the deck, the lock system including a tongue, and a base that supports the tongue for selective engagement within the deck's recess to lock the deck from rotating.

11. A turntable, comprising:
a floor-level deck with an underside and a topside, the deck having a main body formed at least in part from one or more decking elements, and including a topside reinforcement member having a box frame construction spanning a diameter of the deck and connected along the deck's diameter to the one or more decking elements to increase bending resistance across the deck's diameter; and
an above-floor undercarriage configured to support the deck for rotation.

12. The turntable of claim 11, wherein the deck has, at a central area of the deck, a central relief opening from its underside to its topside, and the undercarriage includes a central support system configured to support the deck for rotation by its central area, the central support system including an above-floor stanchion that extends through the deck's central relief, and a topside rotary bearing mounted between the stanchion and the deck to carry the deck for rotation.

13. The turntable of claim 12, wherein the topside rotary bearing is a slewing bearing that has a stationary inner ring connected to the stanchion, and a rotating outer ring connected to the main body of the deck to carry the deck for rotation.

14. The turntable of claim 12, wherein the main body of the deck is formed at least in part from a centrally located hub, with the one or more decking elements being connected to the hub, and the topside rotary bearing is connected to the hub to carry the deck for rotation by the hub.

15. The turntable of claim 11, further comprising:
a peripheral support system configured to support the deck for rotation by a peripheral area of the deck, the peripheral support system including an underside peripheral guide rail connected to the deck, and one or more above-floor trolleys each including one or more rollers on which the underside peripheral guide rail rides.

16. The turntable of claim 11, wherein the deck has, at an intermediate area of the deck, along the deck's diameter, one or more intermediate reliefs opening from its underside to its topside, further comprising:
an intermediate support system configured to support the deck for rotation by its intermediate area, the intermediate support system including, for each of the deck's one or more intermediate reliefs, a topside caster mounting bracket incorporated into the box frame construction of the topside reinforcement member, and a caster mounted to the topside caster mounting bracket and extending through the deck's intermediate relief to ride on a floor.

17. The turntable of claim 11, further comprising:
an above-floor drive system arranged to a side of the deck, the drive system including one or more drive wheels supported for powered rotation against the deck, at a peripheral area thereof, to drive the rotation of the deck.

18. The turntable of claim 17, wherein the drive system includes a drive unit that powers the rotation of the one or more drive wheels, and a base that supports the drive unit for selective radial movement to position the drive unit to engage the drive unit's one or more drive wheels against the deck.

19. The turntable of claim 11, wherein the deck has, at a peripheral area of the deck, a recess, further comprising:
an above-floor lock system arranged to a side of the deck, the lock system including a tongue, and a base that supports the tongue for selective engagement within the deck's recess to lock the deck from rotating.

20. A turntable, comprising:
a floor-level deck having a main body formed at least in part from a centrally located hub and one or more decking elements connected to the hub, the deck having an underside, a topside and, at the hub, a central relief opening from its underside to its topside, and including a topside reinforcement member having a box frame construction connected along a diameter of the deck to the one or more decking elements;
a central support system configured to support the deck for rotation by a central area of the deck, the central support system including an above-floor stanchion that extends through the deck's central relief, and a topside slewing bearing that has a stationary inner ring connected to the stanchion, and a rotating outer ring connected to the hub to carry the deck for rotation by the hub; and
a peripheral support system configured to support the deck for rotation by a peripheral area of the deck, the peripheral support system including an underside peripheral guide rail connected to the deck, and one or more above-floor trolleys each including one or more rollers on which the underside peripheral guide rail rides.

* * * * *